United States Patent [19]
Carstens et al.

[11] 4,134,781
[45] Jan. 16, 1979

[54] METHOD FOR CONTROLLING WARP IN THE MANUFACTURE OF CORRUGATED PAPERBOARD

[75] Inventors: Ronald A. Carstens, Anacortes; William J. Butcher, Battleground, both of Wash.

[73] Assignee: Key Chemicals, Inc., Seattle, Wash.

[21] Appl. No.: 793,397

[22] Filed: May 3, 1977

[51] Int. Cl.² .................. B29C 27/00; B32B 31/00; B31F 1/20
[52] U.S. Cl. .................................. 156/64; 156/75; 156/207; 156/210; 156/356; 156/470
[58] Field of Search .................. 156/64, 205–208, 156/210, 470–473, 462, 75, 356; 162/204; 141/70; 144/327

[56] References Cited
U.S. PATENT DOCUMENTS

| | | | |
|---|---|---|---|
| 3,654,032 | 4/1972 | Kruglinski | 156/205 X |
| 3,751,325 | 8/1973 | Edkvist | 156/205 X |
| 3,981,758 | 9/1976 | Thayer et al. | 156/470 X |

FOREIGN PATENT DOCUMENTS 36-8198  6/1961  Japan .................... 156/210

Primary Examiner—William A. Powell
Attorney, Agent, or Firm—Holman & Stern

[57] ABSTRACT

Effective control of warp in the manufacture of corrugated paperboard sheets on standard corrugator equipment is achieved by the on-line application of a regulated quantity of moisture to one or both sides of the completed corrugated paperboard web after it has been heat-bonded together, while it is still hot from the heat-bonding operation, and prior to its being cut into individual corrugated paperboard sheets. By proper selection of the quantity and placement of the moisture application treatment, it is possible to counterbalance the net effect of the warp-producing conditions developed within the bonded paperboard web prior to and during its bonding operation, so that the resulting paperboard sheets leaving the corrugator will be consistently substantially flat. The moisture application treatment is carried out with an adjustable moisture spray system designed to selectively apply to either or both sides of the bonded paperboard web a variable regulated quantity of moisture.

11 Claims, 2 Drawing Figures

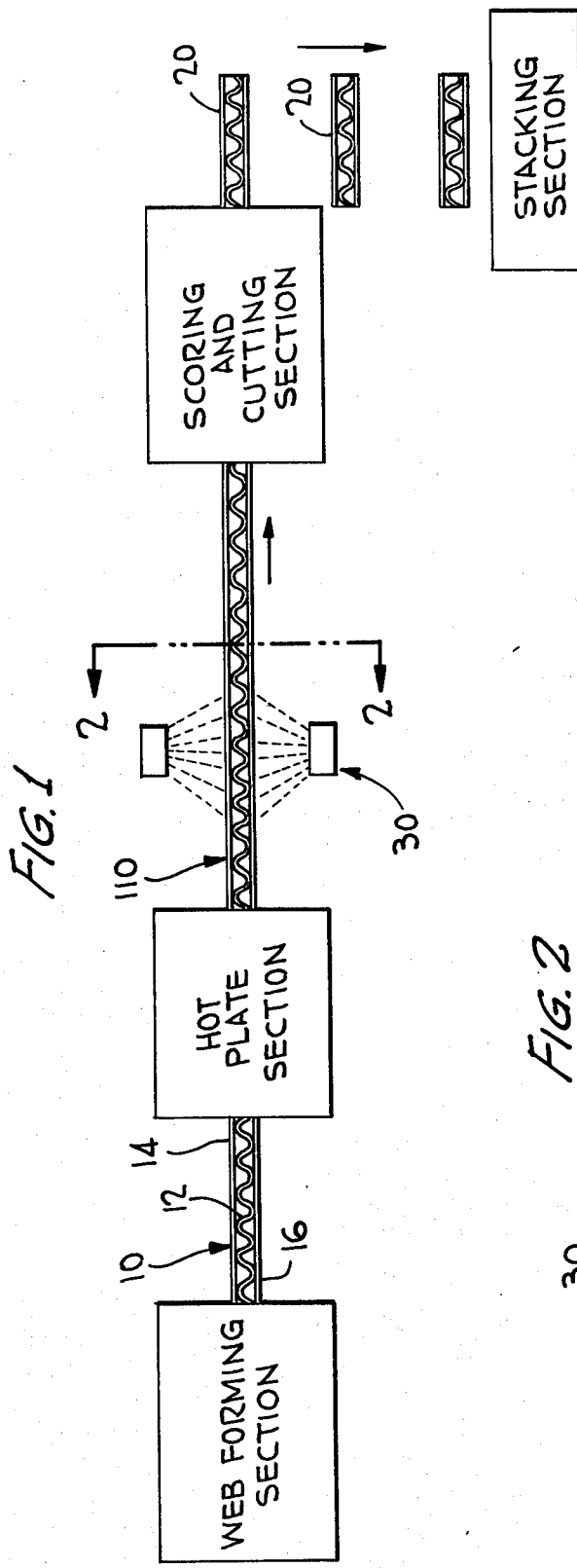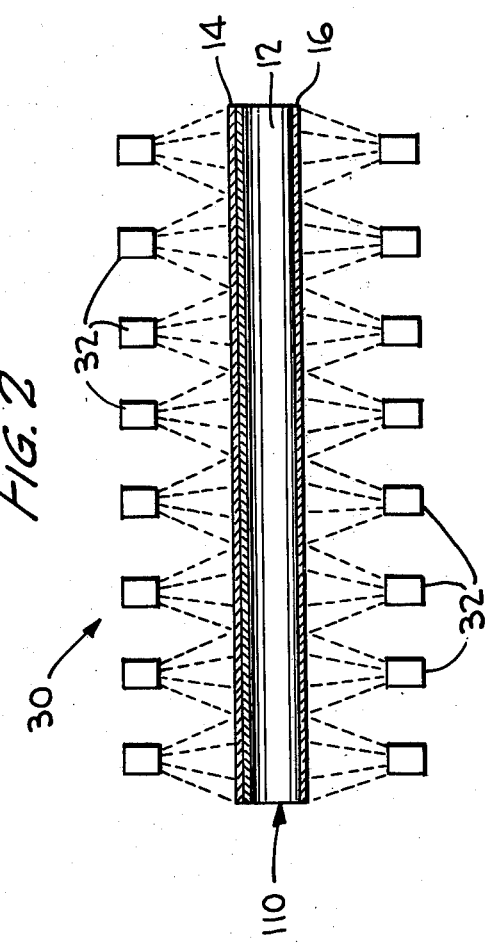

METHOD FOR CONTROLLING WARP IN THE MANUFACTURE OF CORRUGATED PAPERBOARD

BACKGROUND OF THE INVENTION

This invention relates to the manufacture of corrugated paperboard sheets and, more particularly, to the control of warp developed during the manufacture of such sheets.

The standard procedure for the manufacture of corrugated paperboard sheets for use in the packaging industry, involves first forming a continuous composite paperboard web composed of a corrugated paper medium interposed between a top paperliner and a bottom paperliner and provided with a moisture-laden heat-setting adhesive material at the juxtaposed surfaces of the component layers of the web. The thus-formed paperboard web is then passed through a heater where it is heated to a temperature sufficiently high to effect vaporization of moisture from the adhesive material to thereby set the adhesive material and firmly bond together the juxtaposed surfaces of the component layers of the web. The resulting bonded paperboard web is thereafter passed through a cutting mechanism where it is cut into individual paperboard sheets, which are then collected into stacks.

One of the most frustrating problems which has continually plagued the paperboard manufacturer is that of warp in the finished paperboard sheets, which oftentimes reaches a level of severity requiring the scrapping of a substantial portion of the sheet production. Although the causes of warp in corrugated paperboard production have been extensively studied and documented, and various techniques have been proposed for minimizing such causes, a truly effective means for controlling warp to the point of ensuring the production of consistently substantially flat corrugated paperboard sheets still remains the seemingly "impossible dream" of the paperboard manufacturing industry.

It is generally accepted that warp is caused by a number of contributing factors which are developed within the paperboard web prior to and during its bonding operation, and which lead to nonuniform changes in the dimensions of the components of the paperboard structure, particularly the top and bottom liners, which take place subsequent to the bonding operation when there can be no further relative movement between such components. All of these various factors contributing to warp are inherent in the raw materials and procedures employed in forming the bonded paperboard web. Such contributing factors include differences between top liner tension and bottom liner tension, differences in moisture content between the top liner and bottom liner rollstocks, the relatively large amounts of moisture introduced into the web with the adhesive material (which generally contains about 80% water), moisture variations introduced into the web due to nonuniform adhesive application and adhesive rheology, moisture content differentials between the component layers of the web brought about by the bonding operation (which generally involves the direct application of heat to only the bottom liner side of the web, thereby driving mositure from the bottom liner and adhesive up into the corrugated medium and top liner), and the fundamental characteristic of paper on being wetted and then dried to shrink to less than its original length. The presence of these various contributing factors in any of a wide variety of different combinations and degrees leads to the development within the paperboard web of a totally unpredictable set of conditions, the net effect of which could result in producing in the finished paperboard sheet, leaving the corrugator machine, any one of the various types of warp designated in the industry as MD (Machine Directional) up-warp, MD down-warp, CD (Cross-Machine Directional) normal-warp, CD reverse-warp, twist-warp (a combination of MD and CD-warp), and S-warp (a combination of up or normal warp and down or reverse warp).

The previous proposals for controlling warp in corrugated paperboard manufacture, for the most part, have been directed toward attempting to eliminate one or more of the various individual factors contributing to the warp-producing conditions developed within the paperboard web prior to and during its bonding operation. For example, it has been suggested to replace the heat-setting adhesive with a cold-setting adhesive which would not require the application of heat to effect the bonding operation, but this approach has not proved successful due to the lack of any suitable cold-setting adhesive which would in any way compare in performance and economy with the conventionally employed heat-setting adhesives. Other proposals have included trying to eliminate tension differences between the two liners by synchronizing liner speeds; trying to equalize moisture contents of the two liners by treating the individual liners with pre-heaters or water sprays; and trying to improve control of adhesive application. While each one of these proposed systems may reduce or even substantially eliminate a single one of the several factors contributing to warp, it still has not been possible, even when employing all of these proposed systems in combination, to eliminate all of the warp-causing factors and ensure the production of consistently substantially flat paperboard sheets. Moreover, employing a separate control system for dealing with each individual warp-causing factor results in a rather costly installation and hence, would not appear to be the best approach for solving the warp problem from an economical standpoint.

A somewhat different approach to the warp problem in corrugated paperboard is described in the Taylor, U.S. Pat. No. 3,826,178, which, instead of being concerned with an on-line technique for controlling warp before it has actually occurred, relates to a procedure for treating individual corrugated paperboard sheets, off of the corrugator to correct the warp after it has occurred. At this stage of the manufacturing operation, the board is essentially "cold" board, i.e., it has already cooled down from its heat-bonding temperature to room temperature or slightly above, typically within the range of from 80 to 100° F. The Taylor procedure employs a water application roll which applies a controlled amount of water to the convex side of the individual warped sheet of corrugated paperboard off of the corrugator. According to the patentee, when the fibers on the wetted convex side of the sheet dry, they shrink to a greater extent than they had originally, thereby pulling the sheet to a non-warped flat condition. There are several drawbacks to the Taylor procedure which seriously detract from the practicality of employing it as a warp control means in high-speed commerical corrugated paperboard production. First of all, this procedure requires application to the paperboard sheet of relatively large quantities of water, i.e., on the order of approximately 25 to 30 wt% based on the weight of the liner component on the treated side of the paperboard sheet. Since cold board treated with this quantity of water will not reach equilibrium moisture-content conditions with the ambient atmosphere and thereby obtain dimensional stability for a period of from 1 to 2 days, the operator must wait for this period of time in order to determine if he has applied the precise amount of water to correct the warp. Such time lag greatly increases the likelihood of either an undercorrection or an overcorrection of the warp, this latter situation resulting in the sheet becoming warped in the opposite direction from that of the initially treated condition (e.g., an initial CD normal-warp will be converted into a MD down-warp). Additionally, due to the fact that cold board does not readily absorb moisture, stacking of the water-treated cold board will result in moisture being transferred therefrom to the dry side of the adjacent board in the stack, thereby influencing the dimensional changes taking place in the adjacent board and further complicating the predictability of the effectiveness of the treatment. Furthermore, the large amounts of water required by this treatment and the long time lag required for the board to dry to a dimensionally stable condition result in other problems, such as dimpling of the board surface making it difficult to register on a printing roll, reduction of the flat crush strength of the board, and difficulty in getting ink to adhere to the still wet board surface.

BRIEF SUMMARY OF THE INVENTION

It is, accordingly, a primary object of the present invention to provide a method for controlling warp in the manufacture of corrugated paperboard sheets which is highly effective for ensuring the production of the paperboard sheets in a consistently substantially flat condition.

Another object of the invention is to provide a method in accordance with the preceding object, which can be effected on-line on standard corrugator equipment without the need for feeding the paperboard into a separate treatment system.

A further object of the invention is to provide a method in accordance with the preceding objects, which does not require any significant time lag off the corrugator before the paperboard sheet is in dimensionally stable condition ready for printing.

Still another object of the invention is to provide a method in accordance with the preceding objects, which does not in any way adversely affect the properties, surface characteristics or printability of the paperboard sheets.

A still further object of the invention is to provide an apparatus for carrying out the method in accordance with the preceding objects, which can be easily and economically integrated into standard corrugator equipment.

The above and other objects are achieved in accordance with the present invention, which is based upon the discovery that in the manufacture of corrugated paperboard sheets on standard corrugator equipment, it is possible to counterbalance the net effect of all of the various warp-producing conditions within the heat-bonded paperboard web which are developed therein prior to and during the heat-bonding operation and thereby obtain corrugated paperboard sheets directly off of the corrugator which are consistently substantially flat, by means of an on-line moisture application treatment of the heat-bonded paperboard web while it is still hot from the heat-bonding operation and prior to its being cut into individual paperboard sheets. The moisture is applied to one or both sides of the hot bonded paperboard web in regulated quantities so as to control the relative moisture exchange rates of the top and bottom liners of the bonded paperboard web with the ambient atmosphere. It has been found that such relative moisture exchange rates constitute an additional factor influencing warp of the finished paperboard sheets leaving the corrugator and, by proper selection of the placement (i.e., the particular side or sides of the paperboard web treated) and quantities of moisture applied in the treatment, can be adjusted to a certain critical point (hereinafter referred to as the "warp counterbalance point"), which will exactly counterbalance the net effect of all of the various warp-producing conditions previously developed within the bonded paperboard web during the manufacturing operation. The achievement of the warp counterbalance point in the moisture application treatment is indicated by a consistent substantially flat condition of the paperboard sheets in the stacks thereof coming off the corrugator. The paperboard sheets coming off the corrugator, after being moisture-treated in accordance with the present invention, reach dimensionally stable equilibrium conditions with the ambient atmosphere within a period of approximately 1 to 10 minutes, subsequent to their being cut from the bonded paperboard web and are at that point, ready for printing. Moreover, the moisture application treatment in accordance with the present invention, does not in any way adversely affect the properties, surface characteristics or printability of the resulting paperboard sheets.

The moisture application treatment, in accordance with the present invention, is carried out by means of an apparatus which may be easily and economically integrated into standard corrugator equipment. Such apparatus comprises an adjustable moisture spray system which is positioned between the hot plate section and the cutting mechanism of the standard corrugator and which is designed to selectively apply to either or both sides of the hot bonded paperboard web as it passes therethrough a variable regulated quantity of moisture.

Other features and advantages of this invention will become apparent upon reference to the following detailed description of the invention in conjunction with the accompanying drawings, illustrating a preferred embodiment thereof.

BRIEF DESCRIPTION OF THE DRAWINGS

FIG. 1, is a schematic flow diagram illustrating the sequence of steps involved in the manufacture of corrugated paperboard sheets on standard corrugator equipment, and having incorporated therein the novel warp control feature in accordance with the present invention; and FIG. 2, is an enlarged elevational view in the transmachine direction taken along the line 2—2 of FIG. 1, looking in the direction of the arrows, and more clearly illustrating the apparatus employed for effecting warp control in accordance with the present invention.

DETAILED DESCRIPTION OF PREFERRED EMBODIMENTS

Referring now to FIG. 1 of the drawings, there is illustrated therein in schematic fashion the sequence of operations carried out on a standard commercial corrugator machine for the manufacture of corrugated paperboard sheets. As shown, the corrugator includes a web forming section, a hot plate section, a scoring and cutting section, and a stacking section. In the web forming section, in known manner, a top paperliner, a corrugated paper medium and a bottom paperliner are fed from their respective roll stocks through adhesive applicator rolls and into juxtaposition to form a continuous composite paperboard web 10 composed of the corrugated paper medium 12 interposed between the top paperliner 14 and the bottom paperliner 16 and provided with a moisture-laden heat-setting adhesive material at the juxtaposed surfaces thereof. The thus-formed paperboard web 10 is then passed through the hot plate section of the corrugator wherein it is heated to a temperature sufficiently high to effect vaporization of the moisture from the adhesive material and thereby set the adhesive material to firmly bond together the juxtaposed surfaces of the component layers of the paperboard web. The hot plate section on most commercial corrugator machines is composed of heavy cast-iron plates, steam heated to from 340° to 360° F, with weighted rollers on top of a moving belt on the top liner side of the paperboard web, holding the bottom liner side of the web in contact with the hot plates. With this arrangement, the heat-bonding operation of the paperboard web is thus effected by direct application of heat to only the bottom liner side of the paperboard web.

The resulting bonded paperboard web 110 exiting from the hot plate section of the corrugator is typically at a temperature within the range of about 155° to 185° F, with the bottom liner side of the web generally being some 10 to 15 degrees hotter than the top liner side thereof. In the conventional corrugated paperboard manufacturing process, the bonded paperboard web 110 is then passed directly to the scoring and cutting section of the corrugator, wherein it is scored and cut into individual paperboard sheets 20 which are in turn collected into stacks in the stacking section of the corrugator. While traveling from the hot plate section to the scoring and cutting section of the corrugator, the hot bonded paperboard web 110 is in contact with the ambient atmosphere and is simultaneously undergoing a gradual cooling down from its bonding temperature and an exchange of moisture with the ambient atmosphere toward equilibrium conditions. Due to the imbalance in both temperature and moisture content between the top liner 14 and the bottom liner 16 of the web 110 created under the conditions of the hot plate section, the top and bottom liners of the web 110 will generally be undergoing their moisture exchanges with the ambient atmosphere at different rates. This differential in moisture exchange rates is a highly significant one of the various factors influencing warp in the finished corrugated paperboard sheets 20 leaving the corrugator.

The manufacturing operation and equipment thus far described, constitute the conventional corrugated paperboard manufacturing system that has been used by the industry for many years. The novel warp control feature in accordance with the present invention, resides in an adjustable moisture applicator means, positioned between the hot plate section and the scoring and cutting section of the standard corrugator, and designed to selectively apply to either or both sides of the hot bonded paperboard web 110 a variable regulated quantity of moisture. In the preferred embodiment illustrated in FIGS. 1 and 2, the moisture applicator means is in the form of a moisture spray system 30 including a plurality of moisture sprayers 32 uniformly spaced across the width of the bonded paperboard web 110 on each side thereof. Each one of the moisture sprayers is preferably individually controlled, so that, when necessary, as explained more fully hereinafter, the moisture may be applied to the bonded paperboard web 110 only at selected segments across the width thereof.

The moisture spray system 30 is employed as a highly effective warp control means in accordance with the present invention, by effecting an adjustment of the relative moisture exchange rates with the ambient atmosphere of the top liner 14 and the bottom liner 16 of the hot bonded paperboard web 110, to the warp counterbalance point, i.e., the point which will result in a counterbalancing of the net effect of the warp-producing conditions which were developed within the bonded paperboard web prior to and during its bonding operation. Such an adjustment, can be made by proper selection of the side or sides of the web 110 to which the moisture is applied and the quantity of moisture which is applied to the one or each side, provided that the moisture is applied to the web 110 before it has cooled down from its bonding temperature to a temperature below about 130° F. Preferably, the web 110 is at a temperature within the range of about 155 to 185° F, when the moisture is applied thereto. While the moisture applied by the spray system 30 will, for purposes of economy, preferably be in the form of tap water, it is also possible for the moisture to be in the form of hot water or steam. The total amount of moisture required to be applied to the web 110 in order to reach the warp counterbalance point will generally be within the range of about 3 to 15 wt% based on the weight at the machine speed of the particular one of the top and bottom liners on the side of the web to which the moisture is applied.

Because of the many different indeterminate warp-producing variables, which are inherent in the raw materials and procedures employed in the corrugated paperboard manufacturing operation, and the number of different types of warp which could possibly be produced thereby, the proper selection of the two variables in the moisture application treatment, of the present invention, (i.e., the placement and quantity of the moisture employed in the treatment), will of necessity, be a matter of trial-and-error for each particular production run. However, there is one highly significant feature of the present invention which brings order into a seemingly chaotic situation and which imparts a high degree of predictability to the moisture application treatment, as an effective means for warp control. This feature is the fact that the warp-controlling effect of the moisture application treatment of the present invention, becomes apparent substantially immediately, without any significant time lag by monitoring the condition of the individual paperboard sheets 20 in the stacks coming off the corrugator, which reach dimensionally stable equilibrium conditions within a matter of approximately 1 to 10 minutes subsequent to their being cut from the bonded paperboard web 110. The feedback thus generated to the operator allows him to progressively and quickly move toward the warp counterbalance point, the achievement of which is indicated by a consistent substantially flat condition of the paperboard sheets 20 in the stacks. Preferably, the achievement of the warp counterbalance point is determined by monitoring the condition of the stacked paperboard sheets 20 on the top of a stack at approximately 1 to 10 minutes subsequent to their exit from the scoring and cutting section of the corrugator.

The experience derived from carrying out well over two hundred experimental runs has led to the development of a set of basic guidelines which can be followed for achieving the warp counterbalance point with a minimum expenditure of time and effort. After first monitoring the paperboard sheets in the stacks coming off the corrugator for their warped condition which results without any moisture application treatment, the best starting point in the preliminary trial-and-error determination of the two variables in the moisture application treatment, as a general rule, has been found to be the application of 3 wt% moisture (all weight percentages of moisture referred to herein being based upon the weight of the particular one of the top and bottom liners on the side of the bonded paperboard web to which the moisture is applied at the machine speed) to the bottom liner side of the web (i.e., the side of the web which has been in direct contact with the hot plate while passing through the hot plate section of the corrugator). In the vast majority of cases, bottom liner side treatment alone, or at least primarily, in the amount of 3 wt% as a minimum, will prove to be effective for achieving the warp counterbalance point. If the application of 3 wt% moisture to only the bottom liner side of the web does not result in a substantially flat condition of the paperboard sheets in the stacks, and the initially warped condition thereof is either improved or unchanged, the quantity of moisture applied to only the bottom liner side of the web should be increased to about 5 wt%. If such increase results in an improvement of the warped condition of the paperboard sheets in the stacks but has not completely corrected it, the quantity of moisture applied to only the bottom liner side of the web should then be gradually increased, generally up to a maximum of 15 wt%, until the paperboard sheets in the stacks are in a substantially flat condition. On the other hand, if the initial application of 3 wt% moisture to the bottom liner side of the web worsens the initially warped condition of the paperboard sheets in the stacks, or if the increase from 3 to 5 wt% moisture applied to the bottom liner side of the web either does not change or worsens such warped condition, the moisture application should be changed from the bottom liner side to the top liner side of the web, starting at 3 wt% moisture and gradually increasing as necessary, until the paperboard sheets in the stacks are in a substantially flat condition. If, in following the abovedescribed procedure, the moisture application treatment on one or the other side of the web is resulting in an improvement in the warped condition of the paperboard sheets in the stacks but has not yet completely corrected it, and a point is reached at which no further improvement is being obtained by further increasing the quantity of moisture being applied to that side of the web, such point should be maintained constant while simultaneously applying moisture to the opposite side of the web, starting at a quantity of about 1 wt% and gradually increasing, as necessary, until the paperboard sheets in the stacks are in substantially flat condition. When resorting to this double-sided treatment, the warp counterbalance point will generally be achieved with only a minor portion of the total amount of applied moisture being applied to such opposite side.

In most instances, the moisture application treatment of the present invention will be carried out by applying the moisture uniformly across the entire width of the treated web. However, for correcting certain types of warp, such as, for example, that resulting from the presence of moisture streaks in the web or S-warp, it sometimes may be necessary to apply the moisture to either or both sides of the web only at selected segments across the width thereof. For this purpose, it is particularly advantageous that each moisture sprayer 32 in the moisture spray system 30, as shown in FIG. 2, be individually controlled. The number and spacing of the sprayers 32 is preferably such that each sprayer, by itself, will be effective for treating a 6 to 8 inch-wide segment of the web.

The moisture application treatment, of the present invention, has been found to be from 90 to 95% effective in controlling warp in corrugated paperboard manufacture, regardless of the type of warp encountered, to the point of ensuring the production of consistently completely flat paperboard sheets. Even in the remaining 5 to 10% of the cases, where the paperboard sheets obtained were not completely flat, there was a substantial improvement in the warped condition of the sheets. Moreover, the moisture application treatment of the present invention does not in any way adversely affect the properties, surface characteristics or printability of the resulting paperboard sheets, which are in a dimensionally stable equilibrium condition suitable for printing within approximately 1 to 10 minutes subsequent to their exiting from the scoring and cutting section of the corrugator.

While the precise mechanism by which the moisture application treatment of the present invention effects the required adjustments of the relative moisture exchange rates of the top and bottom liners of the bonded paperboard web with the ambient atmosphere, is not known with certainty, it is believed to involve more than merely incorporating an additional amount of moisture into the web. In view of the fact that the moisture application treatment, of the present invention, does not significantly increase the length of time required by the finished paperboard sheets to reach dimensionally stable equilibrium conditions in the stacks, it would not appear that the paperboard web is actually picking up any substantial quantity of additional net moisture from the treatment. Thus, most of the moisture applied to the web, during the treatment, apparently leaves the web in the form of water vapor which escapes from the web surface as it is traveling through the corrugator, downstream of the moisture sprayers. It is believed that the hot temperature of the web at the point of moisture treatment is a critical factor influencing the mechanism by which the moisture application treatment is effective for warp control, and that such mechanism primarily involves a depressing effect upon the fugacity (escaping tendency) of the moisture already in the web from the particular side or sides of the web which are treated, thereby decreasing the moisture exchange rate of that side of the web with the ambient atmosphere.

The above theory of the mechanism of the moisture application treatment, of the present invention, is based upon the following considerations of known physical laws. The driving force causing the moisture to leave the web is proportional to the difference in fugacity, $f_w$-$f_v$, wherein $f_w$ is the fugacity of the moisture in the solid web phase and $f_v$ is the fugacity of the moisture in the adjacent vapor phase. The fugacity of the moisture is its partial pressure or vapor pressure in this case, and at increased temperatures, i.e., increased vapor pressure, there is greater escaping tendency of the moisture in the solid web phase provided that the vapor phase partial pressure is not increased. In the moisture application treatment, of the present invention, there is accomplished a two-fold reduction in the driving force causing the moisture in the web to leave the web. First of all, the web's temperature is decreased, thereby effecting a reduction in $f_w$. Secondly, the vapor phase partial pressure adjacent to the web is increased by virtually flooding it with moisture and creating 100+% humidity situation, thereby increasing $f_v$. Thus, the net effect of the moisture application treatment is to decrease the rate at which moisture in the side of the web being treated leaves the web and passes into the ambient atmosphere.

While the primary advantage of the moisture application treatment, of the present invention, resides in its effectiveness in controlling warp, it also provides certain ancillary benefits, such as improved stacking controls, reduction in cracking of scores, and a cleaner cut-off of the paperboard sheets from the web without buckling or feathering of the edges, this latter benefit being particularly pronounced in the case of double-wall board. In this regard, it should be noted that while the present invention has been described in its preferred embodiments, in terms of a single corrugated medium layer sandwiched between two liner layers, it is likewise applicable to the control of warp in the manufacture of double-wall corrugated paperboard containing two corrugted medium layers and an intervening liner layer interposed between the top and bottom liner layers. Furthermore, it will be understood that various other modifications to the preferred embodiments described herein, are contemplated as being within the spirit and scope of the present invention, such as variations in the number and spacing of the moisture sprayers from that shown, as well as the inclusion in the treating moisture of various beneficial additives, such as wetting agents or surfactants.

What is claimed is:

1. In a method for the manufacture of corrugated paperboard sheets comprising the steps of forming a continuous composite paperboard web composed of a corrugated paper medium interposed between a top paper liner and a bottom paper liner and provided with a moisture-laden heat-setting adhesive material at the juxtaposed surfaces thereof, setting said adhesive material to firmly bond together said juxtaposed surfaces by heating said paperboard web to a temperature sufficiently high to effect vaporization of said moisture from said adhesive material, cutting the resulting bonded paperboard web into individual paperboard sheets, and collecting said paperboard sheets into stacks;

the improvement whereby warp of said paperboard sheets may be effectively controlled comprising the step of applying to at least one side of said bonded paperboard web prior to its being cut into individual paperboard sheets and before it has cooled from its bonding temperature to a temperature below about 130° F a quantity of moisture regulated so as to effect an adjustment of the relative moisture exchange rates of said top and bottom liners of said bonded paperboard web with the ambient atmosphere to the point which will result in a counterbalancing of the net effect of the warp-producing conditions developed within said bonded paperboard web prior to and during its bonding operation, the achievement of said counterbalance point being indicated by a consistent substantially flat condition of said paperboard sheets in said stacks.

2. The method of claim 1, wherein said bonded paperboard web is at a temperature within the range of about 155–185° F when said moisture is applied thereto.

3. The method of claim 1, wherein the total amount of said moisture applied to said bonded paperboard web is within the range of about 3–15 weight percent based on the weight of the particular one of said top and bottom liners on the side of said bonded paperboard web to which said moisture is applied.

4. The method of claim 3, wherein the total amount of said moisture applied to said bonded paperboard web is applied to only one side thereof.

5. The method of claim 3, wherein a major portion of the total amount of said moisture applied to said bonded paperboard web is applied to one side thereof, and a minor portion of said total amount is applied to the other side thereof.

6. The method of claim 3, wherein the setting of said adhesive material is effected by direct application of heat to only the bottom liner side of said paperboard web, and at least a major portion of the total amount of said moisture applied to said bonded paperboard web is applied to said bottom liner side thereof.

7. The method of claim 6, wherein the total amount of said moisture applied to said bonded paperboard web is applied to only said bottom liner side thereof.

8. The method of claim 1, wherein said moisture is applied to said bonded paperboard web in the form of a spray.

9. The method of claim 1, wherein said moisture is applied to said bonded paperboard web uniformly across the entire width thereof.

10. The method of claim 1, wherein said moisture is applied to said bonded paperboard web only at selected segments across the width thereof.

11. The method of claim 1, wherein the achievement of said counterbalance point is determined by monitoring the condition of the stacked paperboard sheets on the top of a stack at approximately 1–10 minutes subsequent to their being cut from said bonded paperboard web.

* * * * *